US011119965B1

(12) United States Patent
Guendert et al.

(10) Patent No.: US 11,119,965 B1
(45) Date of Patent: Sep. 14, 2021

(54) VIRTUALIZED FABRIC CONTROLLER FOR A STORAGE AREA NETWORK

(71) Applicant: International Business Machines Corporation, Armonk, NY (US)

(72) Inventors: Stephen Robert Guendert, Poughkeepsie, NY (US); Michael James Becht, Poughkeepsie, NY (US); Pasquale A. Catalano, Wallkill, NY (US); Christopher J Colonna, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/852,717

(22) Filed: Apr. 20, 2020

(51) Int. Cl.
*G06F 13/40* (2006.01)
*G06F 9/455* (2018.01)

(52) U.S. Cl.
CPC ...... *G06F 13/4027* (2013.01); *G06F 9/45558* (2013.01); *G06F 13/4022* (2013.01); *G06F 2009/45595* (2013.01)

(58) Field of Classification Search
CPC ..... G06F 9/4558; G06F 13/20; G06F 13/4027
See application file for complete search history.

(56) References Cited

U.S. PATENT DOCUMENTS

| | | | | |
|---|---|---|---|---|
| 7,925,802 | B2 * | 4/2011 | Lauterbach | G06F 9/4416 710/38 |
| 8,307,359 | B1 * | 11/2012 | Brown | H04L 69/321 718/1 |
| 9,270,754 | B2 | 2/2016 | Iyengar et al. | |
| 9,686,210 | B2 | 6/2017 | Desanti | |
| 9,722,922 | B2 | 8/2017 | Kamath et al. | |
| 10,104,017 | B2 * | 10/2018 | Berman | H04L 49/70 |
| 2015/0350077 | A1 | 12/2015 | Durrani et al. | |
| 2019/0141010 | A1 | 5/2019 | Chander et al. | |
| 2019/0245811 | A1 | 8/2019 | Sergeev et al. | |

FOREIGN PATENT DOCUMENTS

| | | | |
|---|---|---|---|
| CA | 2405405 | C | 3/2011 |
| KR | 100927748 | B1 | 11/2009 |
| WO | 2018171889 | A1 | 9/2018 |

OTHER PUBLICATIONS

Parab; "Software Defined Storage"; Research Gate; Retrieved Online from https://www.researchgate.net/publication/330840723_Software_Defined_Storage; Dec. 2018; 7 Pages.

* cited by examiner

*Primary Examiner* — Henry Tsai
*Assistant Examiner* — Christopher A Daley
(74) *Attorney, Agent, or Firm* — Cantor Colburn LLP; Steven Chiu

(57) ABSTRACT

Examples described herein provide a computer-implemented method that includes initializing a storage area network. The method further includes managing, using a virtualized fabric controller, the storage area network.

19 Claims, 3 Drawing Sheets

VIRTUALIZED FABRIC CONTROLLER FOR A STORAGE AREA NETWORK

BACKGROUND

Embodiments described herein generally relate to processing systems, and more specifically, to a virtualized fabric controller for a storage area network.

A storage area network (SAN) or storage network provides a dedicated network of storage device(s) to enable a processing system to access consolidated, block-level data storage. To the processing system, the storage device(s) appears to be locally attached and are not accessible to other devices through a local area network (LAN).

SUMMARY

Embodiments of the present invention are directed to a virtualized fabric controller for a storage area network.

A non-limiting example computer-implemented method includes initializing a storage area network. The method further includes managing, using a virtualized fabric controller, the storage area network.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
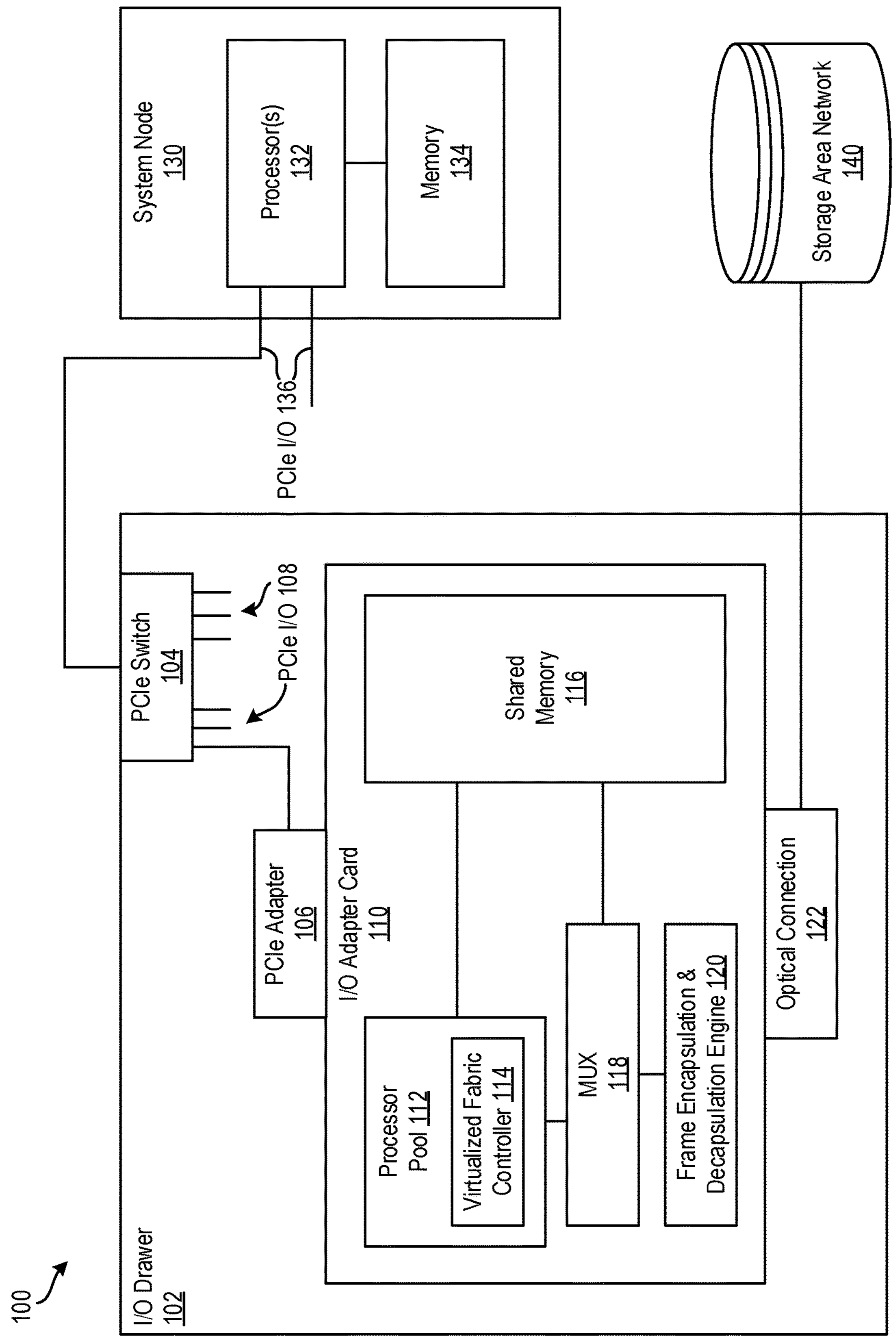
FIG. 1 depicts a block diagram of a processing system for a virtualized fabric controller for a storage area network according to one or more embodiments described herein.

The diagrams depicted herein are illustrative. There can be many variations to the diagrams or the operations described therein without departing from the scope of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

DETAILED DESCRIPTION

One or more embodiments of the present invention provide a virtualized fabric controller for a storage area network (SAN).

Several different approaches to network management have emerged. Two of these include software defined network and network function virtualization. Software defined networking (SDN) provides end users with the capability to have a non-proprietary (i.e., "white box") network where the management and control capabilities do not reside in network vendors' proprietary operating systems and/or management tools. SDN has been applied to conventional internet protocol (IP)/Ethernet-based networking. Some of the features and functionality of SDN include: management/control functionality is shifted into open standards software residing on individual servers, containers, and/or virtual machines (VMs); end users are provided with more control than conventional network management approaches; network vendor lock-in is reduced; and conventional networks are transformed into agile platforms for service delivery.

Network function virtualization (NFV) is a concept that virtualizes elements in a network. In NFV, rather than using a dedicated hardware device to provide a particular function (e.g., a hardware router to provide routing), software running on a processing system is used to provide the particular function. In this way, entire classes of network node functions can be set up as building blocks that can be connected to create overall telecommunications networks, for example. NFV utilizes traditional processing system virtualization but extends the concept significantly. For example, one or more VMs running different software and providing different processes, on top of industry standard high volume processing systems, are able to provide the functions of conventional hardware switches. Examples of virtualized functions that can be provided include: virtualized load balancers, firewalls, intrusion detection devices, wide area network (WAN) accelerators, routers, access control and billing, etc.

Typically, SDN and NFV management are offered through proprietary hardware running a proprietary network operating system (NOS). While effective in large scale environments, such approaches are technically difficult and expensive at smaller scales. In one or more examples, this is accomplished using "white box" networking.

White box networking provides for building a network using switching devices built on commodity hardware that run various NOS. These provide the same level of network performance and reliability but at a lower cost and with more flexibility than traditional proprietary approaches. White box networking relies on the use of standard, commodity hardware (known as "white boxes"). These white box devices can run open source NOS, which can be intended for SDN/NFV use. SDN and NFV are complimentary in that these technologies can work together and the same principles used in NFV can be used in storage networking.

Large scale implementations of SAN often utilize a fibre connection (FICON) or fibre channel protocol (FCP) director class of switches. Such implementations have connectivity requirements that require the use of switching. Smaller scale implementations of SAN have reduced connectivity requirements but higher costs for switching architectures. These smaller scale implementations cannot take advantage of advanced performance monitoring and management capabilities available in larger scale implementations and can be restricted by vendor lock-in and proprietary management tools.

One or more embodiments of the present invention provide a virtualized fabric controller for a SAN. The virtualized fabric controller provides software defined storage area network management and monitoring capabilities without the vendor lock-in and proprietary management tools often encountered in SAN implementations. As an example, the virtualized fabric controller described herein can reside on a channel card (also referred to as an input/output adapter card, or host bus adapter) or in a docker container. The virtualized fabric controller (or simply "fabric controller") can run on processors, application specific integrated circuits (ASICs), and the like that exist on the channel card for example.

Turning now to FIG. 1 according to one or more embodiments described herein, a block diagram of a processing system 100 for a virtualized fabric controller 114 for a SAN 140 is depicted. The processing system 100 can be any suitable processing system, such as an IBM Z® environment processing system for example. The system node 130 can store data in (i.e., transfer data to) and retrieve data from (i.e., receive data from) the SAN 140 via an input/output (I/O) drawer 102, which is communicatively coupled to the system node 130 and the SAN 140 as shown in FIG. 1. In some examples, the system node 130 is coupled to additional I/O drawers (not shown), such as by the peripheral component interconnect express (PCIe) connections 136, which also communicatively couples the system node 130 to the I/O drawer 102.

The system node 130 can include one or more processors 132, a memory 134, and other components (not shown). The system node 130, using the processor(s) 132, executes instructions stored in the memory 134 and transmits data to and receives data from the SAN 140 via the I/O drawer 102.

The I/O drawer 102 includes a PCIe switch 104. The I/O drawer 102 also includes an I/O adapter card 110 (also referred to as a channel card), although the I/O drawer 102 can include additional I/O adapter cards (i.e., channel cards) in other examples. The outputs of the PCIe switch 104 (i.e., the PCIe I/O 108) connect to PCIe adapters on the I/O adapter cards, such as the PCIe adapter 106 on the I/O adapter card 110.

The I/O adapter card 110, which can be a host bus adapter, performs I/O processing on data sent between the system node 130 and the SAN 140. The I/O adapter card 110 utilizes the PCIe adapter 106 to connect to the system node 130 and an optical connection 122 to connect to the SAN 140.

The I/O adapter card 110 can include various components, including a processor pool 112, a shared memory 116, a multiplexer (MUX) 118, and a frame encapsulation and decapsulation engine 120. The processor pool 112 includes one or more processors, which can include one or more central processing units, application specific hardware, application specific integrated circuits (ASICs), application specific special processors (ASSPs), field programmable gate arrays (FPGAs), and the like.

The MUX 118 selects between data from the processor pool 112 and the shared memory 116, and the frame encapsulation and decapsulation engine 120 performs encapsulation and decapsulation on the output of the MUX 118.

The I/O adapter card 110 shown in FIG. 1 also includes a virtualized fabric controller 114, which is executed by the processor pool 112. The virtualized fabric controller 114 thus resides in the channel card (i.e., the I/O adapter 110) and runs on processors/ASICs (e.g., the processor pool 112) that are on the I/O adapter 110. Although not shown, it should be appreciated that the virtualized fabric controller 114 can reside in a docker container executing on the system node 130 instead of on the I/O adapter card 110.

The virtualized fabric controller 114 is a logical entity that performs the management of a SAN switch and is responsible for the operation of the SAN 140. In other words, the virtualized fabric controller 114 acts as a switch in a SAN environment.

The virtualized fabric controller 114 can perform one or more of the following functions: providing, using the virtualized fabric controller, internal operation management of the SAN 140; handling, using the virtualized fabric controller, a request node identification data process; handling, using the virtualized fabric controller, a registered state change notification; managing, using the virtualized fabric controller, initializing of the SAN 140; building, using the virtualized fabric controller, a routing table for data traffic flow through the SAN 140; updating, using the virtualized fabric controller, the routing table for additional data traffic flow through the SAN 140; and/or initializing, using the virtualized fabric controller, an interswitch link for the SAN 140. The features and functionality of the virtualized fabric controller 114 are further described with reference to FIG. 2 herein.

Figure 2:
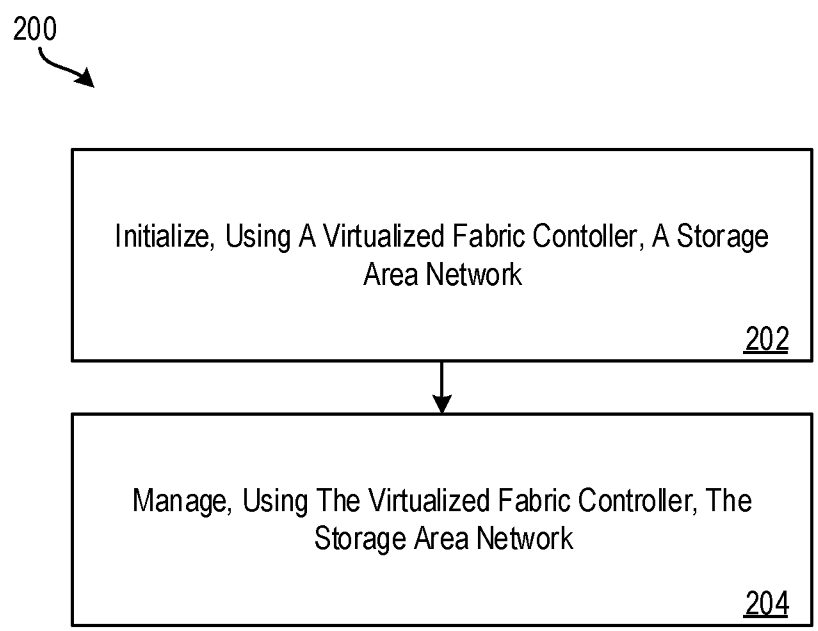
FIG. 2 depicts a flow diagram of a method for a virtualized fabric controller for a storage area network according to one or more embodiments described herein.

Turning now to FIG. 2 according to one or more embodiments described herein, a flow diagram of a method for a virtualized fabric controller for a storage area network is depicted. The method 200 can be performed by any suitable processing system (e.g., the processing system 100, the processing system 300 of FIG. 3, etc.) and/or processing device (e.g., the processor pool 112, one or more of the processor(s) 321 of FIG. 3, etc.). In some examples, the method 200 is performed by the virtualized fabric controller 114 of FIG. 1.

At block 202, the virtualized fabric controller initializes a SAN (e.g., the SAN 140 of FIG. 1). This can include initially setting up the SAN and/or connecting the SAN to a processing system having the virtualized fabric controller 114 (e.g., the processing system 100 of FIG. 1)

At block 204, the virtualized fabric controller manages the SAN (e.g., the SAN 140 of FIG. 1). The virtualized fabric controller is a logical entity that performs the management of a SAN switch and is responsible for the operation of the SAN. The virtualized fabric controller 114 can perform various functions, which are now described in more detail.

According to one or more embodiments described herein, managing the SAN can include providing, using the virtualized fabric controller, internal operation management of the SAN. That is, the virtualized fabric controller performs SAN management that is conventionally performed by dedicated/proprietary hardware executing proprietary NOS as described herein. This enables switching management benefits to be provided where conventional switches are not being used.

According to one or more embodiments described herein, managing the SAN can include handling, using the virtualized fabric controller, a request node identification data (RNID) process. For example, when logging into a switch, an RNID is used for obtaining information about the switch.

According to one or more embodiments described herein, managing the SAN can include handling, using the virtualized fabric controller, a registered state change notification. This enables managing individual port changes.

According to one or more embodiments described herein, managing the SAN can include managing, using the virtualized fabric controller, initializing of the storage area network. This provides a fabric and port login process to exchange port/switch information, such as node port, fabric port, etc.).

According to one or more embodiments described herein, managing the SAN can include building, using the virtualized fabric controller, a routing table for data traffic flow through the SAN. As an example, the virtualized fabric controller tracks routes through the virtualized fabric controller and determines what path through the switch that each port takes. According to one or more embodiments described herein, managing the SAN can include updating, using the virtualized fabric controller, the routing table for additional data traffic flow through the SAN. That is, over time, the virtualized fabric controller learns routing information and can update the routing table accordingly, such as when routes change, are added or removed, etc.

According to one or more embodiments described herein, managing the SAN can include initializing, using the virtualized fabric controller, an interswitch link (ISL) for the SAN. This provides for managing ISLs and what type of routing (static or dynamic) is used.

Additional processes also may be included, and it should be understood that the process depicted in FIG. 2 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide a virtualized fabric controller that brings switching management benefits in SAN implementations that do not use switches. For example, because the virtualized fabric controller can function as a switch, conventional switches can be avoided in certain SAN implementations. This reduces cost and technical complexity of SAN implementations by enabling direct attached storage without a conventional switch. The virtualized fabric controller described herein improves computing systems and associated technologies by implementing SAN "switch" management without a switch, thus avoiding the technical complexities associated with conventional SAN switches. These aspects of the disclosure constitute technical features that yield the technical effect of providing switching functionality in a SAN implementation without a physical switch by using the virtualized fabric controller. It should be appreciated that the above examples of technical features, technical effects, and improvements to technology of example embodiments of the disclosure are merely illustrative and not exhaustive.

Figure 3:
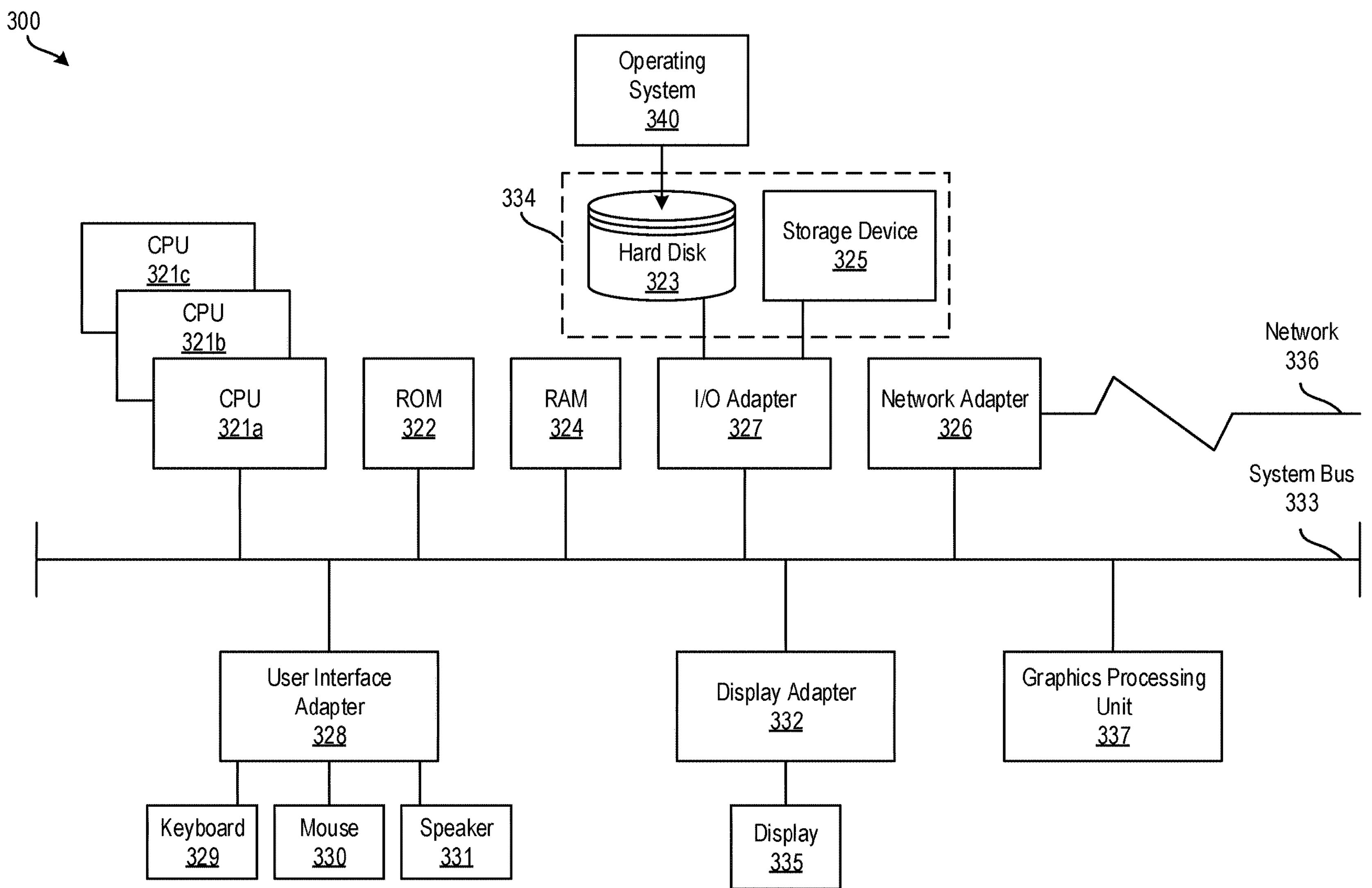
FIG. 3 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 3 depicts a block diagram of a processing system 300 for implementing the techniques described herein. In examples, processing system 300 has one or more central processing units ("processors" or "processing resources") 321*a*, 321*b*, 321*c*, etc. (collectively or generically referred to as processor(s) 321 and/or as processing device(s)). Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a storage device 325 or any other similar component. I/O adapter 327, hard disk 323, and storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store the operating system 340 such as the AIX® operating system from IBM Corporation to coordinate the functions of the various components shown in processing system 300.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:

initializing a storage area network; and managing, using a virtualized fabric controller, the storage area network, wherein the virtualized fabric controller is disposed in a channel card comprising a peripheral component interconnect express (PCIe) adapter, wherein the channel card is disposed in an input/output (I/O) drawer that comprises a PCIe switch communicatively coupled to the PCIe adapter communicatively coupled to a system node via a PCIe I/O connection.

2. The computer-implemented method of claim 1, wherein managing the storage area network comprises:

providing, using the virtualized fabric controller, internal operation management of the storage area network.

3. The computer-implemented method of claim 1, wherein managing the storage area network comprises:

handling, using the virtualized fabric controller, a request node identification data process.

4. The computer-implemented method of claim 1, wherein managing the storage area network comprises:

handling, using the virtualized fabric controller, a registered state change notification.

5. The computer-implemented method of claim 1, wherein managing the storage area network comprises:

managing, using the virtualized fabric controller, initializing of the storage area network.

6. The computer-implemented method of claim 1, wherein managing the storage area network comprises:

building, using the virtualized fabric controller, a routing table for data traffic flow through the storage area network.

7. The computer-implemented method of claim 6, wherein managing the storage area network comprises:

updating, using the virtualized fabric controller, the routing table for additional data traffic flow through the storage area network.

8. The computer-implemented method of claim 1, wherein managing the storage area network comprises:

initializing, using the virtualized fabric controller, an interswitch link for the storage area network.

9. The computer-implemented method of claim 1, wherein the channel card comprises a processor, a memory, a multiplexer, the multiplexer selecting between first data from the processor and second data from the memory.

10. The computer-implemented method of claim 1, wherein the channel card further comprises an optical connection that communicatively couples the channel card to the storage area network.

11. A system comprising:

a memory comprising computer readable instructions; and a processing device for executing the computer readable instructions, the computer readable instructions controlling the processing device to perform operations comprising:

initializing a storage area network; and managing, using a virtualized fabric controller, the storage area network, wherein the virtualized fabric controller is disposed in a channel card comprising a peripheral component interconnect express (PCIe) adapter, wherein the channel card is disposed in an input/output (I/O) drawer that comprises a PCIe switch communicatively coupled to the PCIe adapter communicatively coupled to a system node via a PCIe I/O connection.

12. The system of claim 11, wherein managing the storage area network comprises:

providing, using the virtualized fabric controller, internal operation management of the storage area network.

13. The system of claim 11, wherein managing the storage area network comprises:

handling, using the virtualized fabric controller, a request node identification data process.

14. The system of claim 11, wherein managing the storage area network comprises:

handling, using the virtualized fabric controller, a registered state change notification.

15. The system of claim 11, wherein managing the storage area network comprises:

managing, using the virtualized fabric controller, initializing of the storage area network.

16. The system of claim 11, wherein managing the storage area network comprises:

building, using the virtualized fabric controller, a routing table for data traffic flow through the storage area network.

17. The system of claim 16, wherein managing the storage area network comprises:

updating, using the virtualized fabric controller, the routing table for additional data traffic flow through the storage area network.

18. The system of claim 11, wherein managing the storage area network comprises:

initializing, using the virtualized fabric controller, an interswitch link for the storage area network.

19. A computer program product comprising a computer readable storage medium having program instructions embodied therewith, the program instructions executable by a processor to cause the processor to perform operations comprising:

initializing a storage area network; and managing, using a virtualized fabric controller, the storage area network, wherein the virtualized fabric controller is disposed in a channel card comprising a peripheral component interconnect express (PCIe) adapter, wherein the channel card is disposed in an input/output (I/O) drawer that comprises a PCIe switch communicatively coupled to the PCIe adapter communicatively coupled to a system node via a PCIe I/O connection.

* * * * *